(12) United States Patent  
McGwire

(10) Patent No.: US 8,615,133 B2  
(45) Date of Patent: Dec. 24, 2013

(54) PROCESS FOR ENHANCING IMAGES BASED ON USER INPUT

(75) Inventor: Kenneth C. McGwire, Reno, NV (US)

(73) Assignee: Board of Regents of the Nevada System of Higher Education, on behalf of the Desert Research Institute, Reno, NV (US)

( * ) Notice: Subject to any disclaimer, the term of this patent is extended or adjusted under 35 U.S.C. 154(b) by 832 days.

(21) Appl. No.: 12/532,582

(22) PCT Filed: Mar. 26, 2008

(86) PCT No.: PCT/US2008/058301  
§ 371 (c)(1),  
(2), (4) Date: Sep. 22, 2009

(87) PCT Pub. No.: WO2008/118977  
PCT Pub. Date: Oct. 2, 2008

(65) Prior Publication Data  
US 2010/0104191 A1 Apr. 29, 2010

Related U.S. Application Data

(60) Provisional application No. 60/920,173, filed on Mar. 26, 2007, provisional application No. 60/920,757, filed on Mar. 28, 2007.

(51) Int. Cl.  
*G06K 9/00* (2006.01)

(52) U.S. Cl.  
USPC ............................ 382/191; 382/167; 433/223

(58) Field of Classification Search  
USPC ......................................... 382/181, 173, 167  
See application file for complete search history.

(56) References Cited

U.S. PATENT DOCUMENTS

| | | | |
|---|---|---|---|
| 6,404,923 B1 | 6/2002 | Chaddha | |
| 6,421,463 B1 | 7/2002 | Poggio et al. | |
| 6,575,751 B1* | 6/2003 | Lehmann et al. | 433/223 |
| 6,674,880 B1 | 1/2004 | Stork et al. | |
| 7,965,890 B2* | 6/2011 | Marcus et al. | 382/173 |
| 8,036,456 B2* | 10/2011 | Stellbrink | 382/167 |
| 2005/0271280 A1* | 12/2005 | Farmer et al. | 382/224 |
| 2005/0276477 A1* | 12/2005 | Lin et al. | 382/173 |
| 2006/0269140 A1* | 11/2006 | Ramsay et al. | 382/191 |
| 2012/0076406 A1* | 3/2012 | Fisher | 382/168 |

OTHER PUBLICATIONS

Notification Concerning Transmittal of International Preliminary Report on Patentability (Chapter I of the Patent Cooperation Treaty) for PCT/US08/58301 mailed Oct. 8, 2009.  
Notification of Transmittal of the International Search Report and the Written Opinion of the International Searching Authority, or the Declaration for PCT/US08/58301 mailed Aug. 15, 2009.

* cited by examiner

*Primary Examiner* — Hadi Akhavannik  
(74) *Attorney, Agent, or Firm* — Ryan A. Heck; UNR-DRI Technology Transfer Office

(57) ABSTRACT

An imaging or data processing method using statistical analysis to determine features of interest in an image or data set. Particular implementations of the imaging or data processing methods relate to refining the results of an image processing method using iterative examination of posterior probabilities or external feedback.

12 Claims, 4 Drawing Sheets

PROCESS FOR ENHANCING IMAGES BASED ON USER INPUT

This application claims priority to U.S. Provisional Application No. 60/920,173, filed Mar. 26, 2007 and U.S. Provisional Application No. 60/920,757, filed Mar. 28, 2007, each of which is hereby incorporated by reference.

FIELD

The present disclosure relates generally to imaging or data processing methods, such as image processing using statistical analysis. Particular implementations of the present disclosure relate to refining the results of an image processing method using iterative examination of posterior probabilities or external feedback.

BACKGROUND

There are two main approaches to statistical classification of image data, termed supervised and unsupervised. Supervised approaches take examples of spectra provided by a user and identify which example most resembles a pixel in an image dataset. Unsupervised methods break the image into a number of similar clusters, and require a user to assign a posteriori labels to these clusters.

Supervised statistical methods in image processing, however, typically do not support automated methods of collecting pixels for contrasting features in the image. In addition, although probability estimates from supervised methods are calculated and presented in existing image processing software, typical methods do not use probability information in an intelligent way to extend the collection of samples from a user-specified point or for any established logic for iteration. As a result, many existing methods and tools are labor intensive or require substantial user experience to effectively be used with large multidimensional datasets, or otherwise do not utilize user experience effectively, much less in a relatively simple manner.

Although existing methods for unsupervised classification generally use iterative methods, they have limited ability to identify specific features and can suffer from one or more of the following disadvantages:

Labor intensive. A posteriori identification of statistical clusters that relate to "the feature(s)" can require tedious manual assessment.

Difficulty dealing with false positives. Without a priori definition of "the feature(s)" of interest in the data, there is a relatively high probability that a clustering algorithm will split "the feature(s)" among a number of clusters that each have unique problems with false positives.

Failure to use relevant statistical measures. Any measure of spectral similarity or probability that results from the clustering will be relative to each of the various cluster centers that are selected, rather than representing a consistent probabilistic relationship to the mean and variance for "the feature(s)" in the various dimensions of measurement in the dataset. Such data is typically of reduced utility and can be incompatible with an automated, iterative process for extracting (or suppressing) particular features (false positives).

A number of methods exist for extracting information from datasets that are not statistical in nature. Such methods are typically based on assessing the geometry of the spectral curve associated with each pixel relative to either a single (e.g. matched filtering) or multiple (e.g. spectral mixture modeling) examples. Simple calculations of the similarity of pixels to a single example spectra, such as matched filtering, generally do not benefit from the properties of statistical modeling in terms of providing a framework for variable selection and the weighting of spectral ranges where there is more information (signal) over those that are very similar to other targets, have little information, or introduce excessive noise. The process of selecting wavelength ranges to optimize the performance of methods like matched filtering typically requires detailed manual interaction, technical proficiency, and phenomenological knowledge. Even then, the ability to weight different spectral ranges is generally not present.

A further technique called "mixture-tuned matched filtering" uses more sophisticated consideration of the interrelationships of various image components by using overall image statistics to flag possible false positives. However, the aforementioned benefits of a statistical approach are not realized. In spectral mixture modeling methods, the user develops a number of reference spectra, referred to as end-members, to describe all the significant spectral variation in the image (target and non-target). This approach typically requires intensive interaction and technical knowledge to develop appropriate endmembers. There is an automated form of spectral mixture modeling in the ENVI software package, but it has the same problems that were mentioned above for unsupervised methods when faced with features that are well represented by individual ideal examples, and it does not support any of the efficient manual interaction described herein.

The aforementioned non-statistical methods have demonstrated difficulty in reliably identifying features that have a substantial amount of inherent variability in measured characteristics. Thus, in the example of a dataset comprising a satellite-based index of photosynthetic activity at different times of the year that is sampled over a range of map coordinates (e.g. latitude/longitude), different trees of a given species may be of varying size, blooming at different times, diseased, damaged, or stressed.

One example of a semi-automated feature extraction method that combines a user-specified spectral curve in conjunction with an unsupervised method of explaining residual image variability is Boardman and Kruse, 1994, Automated spectral analysis: a geological example using AVIRIS data, north Grapevine Mountains, Nev., in *ERIM Tenth Thematic Conference on Geologic Remote Sensing* (Environmental Research Institute of Michigan, Ann Arbor, Mich.) pp. I-407 to I-418, incorporated by reference herein in its entirety. The method they describe, however, is based on the non-statistical method of spectral mixture modeling, so it typically does not perform well with features (user-selected or computer selected) that have substantial variability in measurements or where there are undesired image components that have similar measurements to the feature of interest. Their method does not allow variable selection from the set of measurements or weighting of variables to maximize statistical differences. Once a result is calculated, that existing method has no logic to refine the results, either automatically or based on user feedback. This method also generally provides no information on a data transformation that would convert measurements directly into an estimate of the probability of purity of the feature in an image.

Another recent approach in the general area of spectral feature recognition is the VIPER-tools product developed by Dar Roberts and others. Like the Boardman and Kruse method above, VIPER tools proceed using a mixture modeling approach that measures the degree to which a pixel matches individual reference spectra. However, VIPER-tools do attempt to characterize the potential heterogeneity of target features by providing tools to collect a number of characteristic spectra for the image. The method presented herein is substantially different from VIPER-tools in its ease of use, effective utilization of information of per-pixel probabilities, and iterative framework. VIPER-tools presents the user with complex abstract plots to describe the variation in images prior to classification, the user is required to review an extensive list of tabular feedback to help select representative spectra, there is no framework for variable selection to select the best wavelengths, and the approach assumes substantial technical expertise. Though VIPER-tools is based on multiple endmember spectral mixture modeling, which is designed to deal with variable mixtures of image components, as of this writing there is no straightforward way to get a result that simply presents the proportion of a given image component independent of all other features in the image (this limitation was confirmed by Kerry Halligan, one of the VIPER-tools developers).

SUMMARY

In one embodiment, the method can proceed as follows:

Step 1: Identification of the Feature(s)

Users are presented the image, and they select one or more locations in the image that they can confidently identify as being representative of a relatively pure example for one or more features of interest, hereafter referred to as "the feature(s)." This selection could be done by drawing simple polygons, lines, or points with a mouse or other input device on the image displayed on a computer screen. Once the user indicates that they are done collecting these training samples, the method stores the spectral information for image pixels within those regions for subsequent analysis. In addition, the method may generate a number of transformations of the original data in order to test their utility. Examples of these transformations could include the mathematical derivatives or representations of broader curvature (e.g. depth, width, integrated area above or below the curve) in multi-dimensional datasets (e.g. spectral reflectance). In cases where the method is targeted for specific applications, typical data transformations used in those applications may also be tested. Examples of typical data transformations may include the normalized difference vegetation index (NDVI) or tasseled-cap transformation in agricultural mapping from satellite data.

As described infra, additional methods may be used to indicate the locations of the feature(s) within an image.

Step 2: Possible Manual Identification of Contrasting Samples

The user may also identify a set of locations that contrast with the feature(s). Data corresponding to this contrasting sample set will be referred to as "not the feature(s)." The method may provide immediate feedback to the user on the expected feasibility of separating the feature(s) from this specific set of contrasting samples using either direct measures of statistical separability (e.g. Jeffries-Matusita distance, Transformed Divergence) or applying a classifier (e.g. Linear Discriminant Analysis, Maximum Likelihood, Mahalanobis Distance, Spectral Angle Mapper, etc.) and testing the classification accuracy for the user-defined samples.

Step 3: Automated Generation of Contrasting Samples

Without the need for further user interaction, an automated sampling of pixels is then taken from the image to represent other areas that may, or may not, contain the feature(s) of interest. Samples acquired in this process are added to the set that is considered not the feature(s) regardless of their true nature. Data for the two cases (the feature(s), not the feature(s)) are then used in a statistical routine that generates a linear (e.g. linear discriminant analysis) or non-linear (e.g. logistic regression) transformation function that relates the data values to the probability or proportion of a given image sample being the feature(s). The transformation function is then applied to the entire image, and a tractable proportion of pixels with higher probability scores are then sampled again and added to the not the feature(s) dataset, since these pixels are likely to include false-positives (i.e. not the feature(s)) in addition to the feature(s) itself. Because the statistical analysis is relatively insensitive to the inclusion of false negatives in the not the feature(s) set, successive iterations develop a more refined transformation of the spectral data that removes false positives. The threshold probability score for sampling new "non-feature" pixels may be adjusted in each iteration. In cases where multiple features or non-features are developed, the probability scores used in the iterative process may represent different transformations that isolate specific pairwise groupings of sub-types for "the feature" versus "not the feature." The algorithm repeats a number of times, collecting additional samples from the image that have high probability scores in each successively refined transformation. Stopping criteria may include a specified number of iterations, a period of time, a measure of convergence in results, the degree to which training samples can be correctly predicted, or tests of the spatial pattern in the transformed results (e.g. texture, fractal dimension, uniformity, spatial autocorrelation). The user might also be presented with textual or graphical feedback to allow a manual stop to the process. This feedback could be a simple indicator or an updated plot of a metric of success (e.g. convergence, accuracy) for each iteration. This feedback could also be a graphical presentation of the transformed image for the current iteration.

As described infra, other data analysis techniques may also be applied in this Step 3.

After the automated iterations reach the stopping criteria, the resulting statistical scores (i.e. probabilities) for each pixel are examined and a threshold value is estimated in order to label image pixels as containing some measurable proportion of the feature(s) or not. Methods of estimating the appropriate threshold may include an analysis of the statistical separation, back-classification on the user-specified pixels, or assumed patterns of spatial variation in probabilities in the neighborhood of selected image pixels.

The resulting map is overlain on the image for the user to assess in Step 4. Samples whose transformed value is below the current threshold may be transparent, while pixels above the threshold are displayed over the image in a manner that relates to the abundance or probability of the feature(s) in each pixel. Users may refine the threshold value, possibly by dragging a slider widget.

Step 4: Manual Refinement

Once the result of the automated iterations is presented, the user may identify a number of areas in the initial result that appear to be false positives. The user identifies those areas on the image/result where they believe the initial result to be in error (false positive). These user-selected samples are then included in another iteration of the statistical routine, and the user interface is updated with the refined results. Other post-user-identification processing steps may also be utilized.

The method may provide different methods of reporting the final results of the analysis. These may include measures of area coverage of the feature(s) within the image (e.g. % of image, acreage) or measures of the spatial configuration of the feature(s) (dispersion, contagion, fractal dimension, spatial autocorrelation, trend surface parameters). The method may also present the user with measures of accuracy based on user supplied reference data (e.g. percent correctly classified, Kappa coefficient, contingency matrix, correlation, $r^2$). The transformation(s) of the image (possibly calibrated) may also be saved/exported for use later or in other software.

Step 5: Calculating a More Robust Image Transformation for the Feature(s)

The process of successfully classifying the feature(s) in the image data produces a derived information product: a data transformation that can be used to identify the feature(s) in other similar image products. However, certain robust methods (e.g. stepwise variable selection) that enhance the generality of calculated data transformation may take additional time and provide relatively little additional value when attempting to get results from a single image. As such, a different method may be used in calculating a robust transformation for future use than was used in the iterative framework. If a robust technique is desired but is too slow for typical user interaction, this method may recalculate the transformation using robust methods after the aforementioned steps are completed. This transformation may be derived from the same statistical techniques used in steps 3 and 4, or alternate methods may be tested against the default in order to develop the most robust image transformation.

For example, linear discriminant analysis may use all available data in steps 3 and 4, but change to a robust stepwise method for step 5. Alternately, if the final state of the method shows that alternate techniques (e.g. regression tree, matched filtering on selected data dimensions) would provide better results either with respect to accuracy or efficiency, the method may provide results of the different transformation method to the user for approval and allow the user to save that transformation for future use.

The present method may be performed on a single personal computer or other computer or computing system, either localized or distributed. In one embodiment, the images may be presented on one or more computer screens, and in the manual identification steps as implemented, a user may identify a "feature of interest" or "not the feature" by using a mouse or other pointing or identification device to identify the point or area for the identification in issue. Similarly, the computer screen may be a touch screen, and the user may use a pointing device, such as a finger, pointing tool. etc., to identify the point or area for the identification in issue. Thus, in certain such embodiments, the user need have very little, if any, sophistication in utilization of the mathematical analysis techniques implemented by the system.

In other embodiments, or in conjunction with such manual intervention methods or systems, a user may identify one or more features of interest, not the (a) feature of interest, or other aspects of information in any number of ways. A sliding scale, a drop down menu, or numerical, typographic, or other information input techniques may be utilized.

Although generally described for use in image processing, at least certain disclosed methods can be applied to other types of data processing, particularly those methods where user-feedback can be beneficial in improving analytical accuracy in an iterative process.

The image analysis processes described herein can solve various shortcomings of existing methods. For example, its method of sample collection can involve less user training and judgment while providing a systematic approach that can create superior results. Like unsupervised techniques, the method described herein contains steps that perform iteratively to explain variability in an image. However, at least certain embodiments of the disclosed iterative process refine statistical transformations, rather than grouping datapoints into clusters.

The disclosed methods are broadly applicable, and at least certain implementations provide one or more of the following advantages:

Exploits the robustness of the statistical methods to false negatives to allow for automated iteration, thereby enabling a logic for the iterative refinement of a statistical transformation to identify the feature. This approach is not a generally recognized approach in image processing, particularly in image processing the environmental sciences.

Intelligently uses probabilistic information from the statistical method to guide iterative sample collection (collection of samples for contrasting features in supervised classification is currently manual) for samples that are not the feature(s).

Uses the probabilities from the latest automatic or manual iteration to extend the user's identification of areas with false positives in a vastly more efficient way than provided in existing software.

No known image processing software package for this type of application typically generates, or uses, the specific spectral transformations that are computed by this process. Those exemplars can be used to generate a library of specific targets or features (based on a body of work and validation).

At least certain implementations of the methods of the present disclosure differ in one or more ways from existing analytical approaches.

For example, existing supervised methods typically collect one set of candidate samples for representing image variability up front and do not have automated logic to adjust this initial sampling to refine/improve results. Existing unsupervised methods generally work to define each component in the scene as a separate entity, with the inherent problems mentioned above. In particular configurations, the unsupervised part of the presently disclosed methods develops a statistical transformation to separate the feature of interest regardless of the structure of measurements of the other image components.

Prior methods that use individual reference spectra for "pure" image components typically do not deal well with features that have inherent variability in measured parameters. For most natural surfaces there is substantial natural variation that is not captured adequately without considering the feature(s) as having a distribution of data values by using a statistical framework. For this reason, spectral mixture modeling often does not perform well in separating very similar natural materials. Because it assumes the image variability is the result of invariant, pure components, the spectral mixture approach is typically not as robust to user error as particular implementations of the present disclosure.

The prior methods generally do not provide an equivalent capacity to incorporate user feedback on the accuracy of results for subsequent refinement. In at least certain configurations, the presently disclosed method uses probabilistic information from its underlying statistical method to guide the user's sample selection.

Prior methods do not create an equivalent final transformation that can be applied directly to a new image to indicate the relative proportion or probability of the feature(s). For the aforementioned non-statistical methods, the entire algorithm must be run from scratch each time. While there are examples of the actual statistical method described here being used in image classification, we know of no such application using its data transformation as a logic to refine sampling. Among references we have found, this method has only been used for traditional supervised classification.

Prior data transformations in the field of image analysis for Earth Sciences, such as the "tasseled cap" transformation, only identify a set of very coarse, precomputed indicators of image content, such as the greenness, brightness, or wetness of a given image pixel. There is a large amount of literature on the use of principal components analysis (PCA) to transform image data, but typical PCA methods are entirely data driven and therefore subject to the same problems as unsupervised classification (e.g. information on the feature of interest may be distributed across multiple transformations, the transformation is different for every image).

There is a method similar to PCA called partial least squares regression (PLS) that uses variation in measurements of interest to constrain a transformation of another set of measurements. The resulting transformation contains information that may be used to predict the feature of interest. The proper use of PLS makes the assumption of continuous variation within the measurements, but the type of feature identification being performed here is associated with the binomial distribution for proportions ranging between fixed limits of presence (1) and absence (0) rather than continuous variation. In addition, we know of no examples of PLS being applied in the form of iterative and interactive analysis described herein.

In particular implementations, the disclosed process of identifying manually false positives described has some similarity to the "seed" method that is available in many drawing software programs. The typical seed operation grabs a number of contiguous pixels in the image that have similar characteristics to a chosen seed point. At least certain methods described here can extend the seed approach by identifying noncontiguous areas elsewhere in the image that are spectrally similar and have a high probability of being confused with "the feature(s)."

There are additional features and advantages of the subject matter described herein. They will become apparent as this specification proceeds.

In this regard, it is to be understood that this is a brief summary of varying aspects of the subject matter described herein. The various features described in this section and below for various embodiments may be used in combination or separately. Any particular embodiment need not provide all features noted above, nor solve all problems or address all issues in the prior art noted above.

BRIEF DESCRIPTION OF THE DRAWINGS

Various embodiments are shown and described in connection with the following drawings in which.

DETAILED DESCRIPTION

Figure 1:
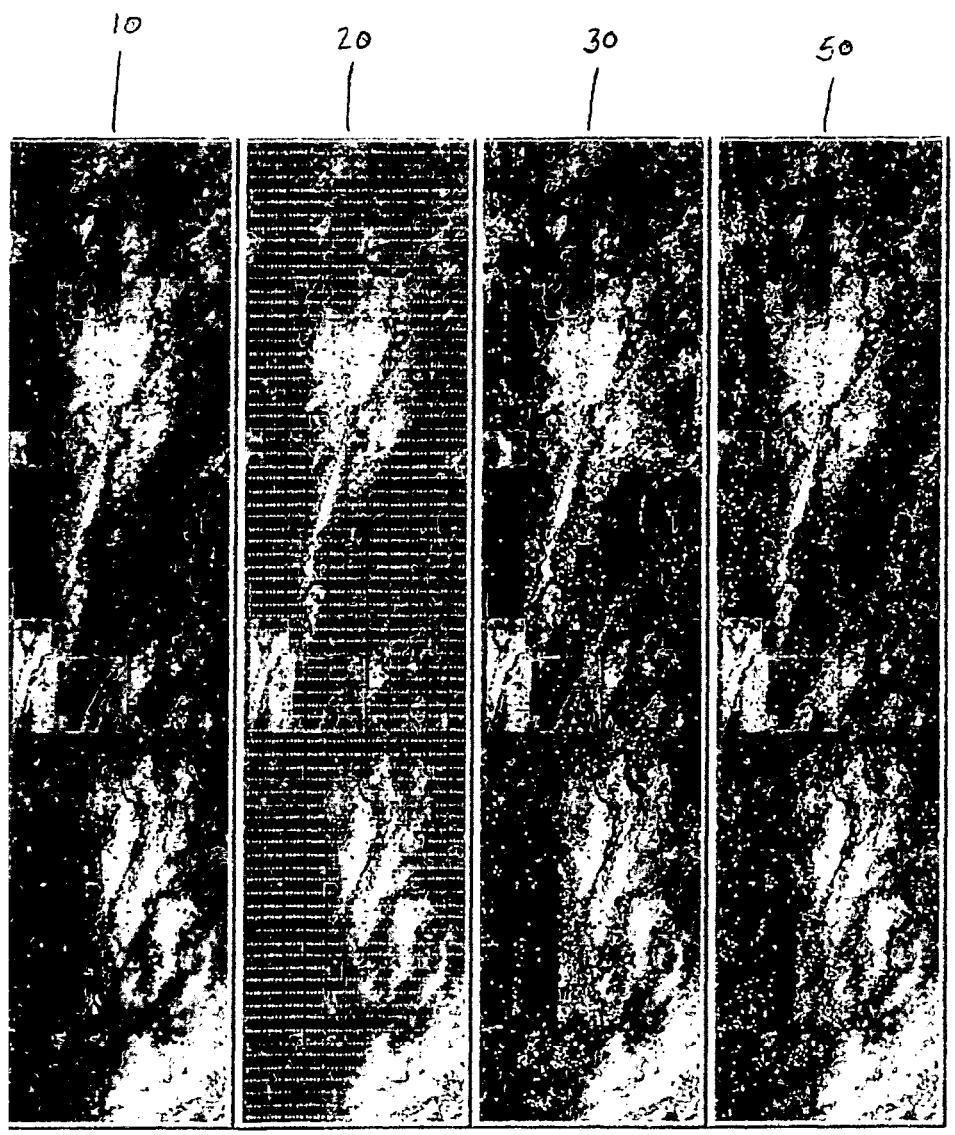
FIG. 1 shows a hyperspectral image dataset collected from an aircraft over an area north of Winnemucca, Nev. A user has already identified a number of locations on the image where a weed called tall whitetop is found, and the white dots on the subsequent panels of the Figure show how the method might first select samples from a regular grid, and then subsequent iterations collect additional samples from different areas as the statistical transformation is sequentially refined.

Unless otherwise explained, all technical and scientific terms used herein have the same meaning as commonly understood by one of ordinary skill in the art to which this disclosure belongs. In case of conflict, the present specification, including explanations of terms, will control. The singular terms "a," "an," and "the" include plural referents unless context clearly indicates otherwise. Similarly, the word "or" is intended to include "and" unless the context clearly indicates otherwise. The term "comprising" means "including;" hence, "comprising A or B" means including A or B, as well as A and B together.

Although methods and materials similar or equivalent to those described herein can be used in the practice or testing of the present disclosure, suitable methods and materials are described herein. The disclosed materials, methods, and examples are illustrative only and not intended to be limiting.

The term "image" as used herein means the general concept of a visualization or graphical representation of a multi-dimensional dataset that is presented to the user within a geometric framework and is not specifically limited to the particular implementation of a photograph. The dataset contains information or measurements. In the case of a commonly known specific case, a typical standard digital color photograph, for example, the dimensions of measurement would be the amount of light energy sampled in three ranges of wavelengths (red, green, blue), and the geometric framework for a corresponding image is an arbitrary two-dimensional Cartesian framework based on the viewing geometry—e.g., a picture.

In this description, "image" as broadly defined above can include, for example: a satellite-based index of photosynthetic activity at different times of the year that is sampled over a range of map coordinates (e.g. latitude/longitude); brain activity sampled repeatedly over microseconds within a three-dimensional volume; or, in earth science analyses, an even more disparate collection of measurements within a region like temperature, moisture, and electrical conductivity within a block of soil. If measured or interpolated within a regularized framework, the coordinate system of the image may be based on the data measurements themselves rather than having an inherent geometric or geographical meaning. That is, the points of an image are not necessarily correlated to a spatial distribution, as might be the case with aerial imagery of a geographic region. For example, given a suitable dataset the image may be a multi-dimensional plot of conductivity and shear strength relative to the axes of temperature and pressure. The data dimensionality may represent direct measurements, calculations, or derived information that is based on spatial relationships within a single dimension of measurement (e.g. slope, curvature, aspect, texture, contagion, fractal dimension), between measurement dimensions (e.g. ratios, linear or non-linear transformations, principal components), or a combination thereof (e.g. fractal dimension of the ratio of red and near infrared wavelengths). As used herein, "image" also extends to the use of animations that display measurements within a temporal sequence.

As used herein, the term "pixel" refers to any data point in a database that can be displayed graphically in an image in the sense described above. Moreover, unless the context specifically indicates a graphic display, the term "image" further refers to all entries in such a dataset. Thus, a reference to a "pixel" does not necessarily mean that such a corresponding data point is literally graphically displayed on a monitor. Of course, where a large dataset has more entries than can be rendered in a graphic display, not every data point will literally be displayed graphically. The foregoing usage is understood in the art of remote sensing, and such interchangeable use of "image," "dataset," or "pixel" is readily understood therein.

The purpose of image analysis as described herein is analyzing the image dataset for features of interest. A "feature" is a particular relation or measured property that may be contained in the dataset. For example, in a dataset comprising a satellite-based index of photosynthetic activity at different times of the year that is sampled over a range of map coordinates (e.g. latitude/longitude), one feature of interest might be the spectra of reflectance for a particular species, or from a particular type of vegetation. As explained herein, such a "feature" might not even be present in measured data in isolated form, but might form a component of measured data. The feature may be a property that a user wants to isolate or extract from the data, or a relation that the user wants to isolate and suppress in the data. The term "the feature(s)" will be used herein to indicate one or more such features of interest that the user identifies to the image analysis process for further analysis.

Overview

Although the methods of the present disclosure can be practiced in a variety of ways, in order to illustrate at least certain aspects of the present disclosure, particular implementations of an image analysis process is described in detail as follows.

Step 1: Identifying Features of Interest

The dataset is rendered in a suitable graphical depiction or image. One or more features of interest, which the user wants to examine in the data, are identified by the user. A feature is a particular relation or measured property that may be contained in the dataset. For example, if the dataset is multidimensional hyperspectral imagery of a geographic region, a feature might comprise a collection of the particular reflectance spectra that provide an example of the mean and variance with, or contained within, measurements at selected entries in the dataset.

The user can identify the features of interest, or an estimate or approximation of them, by identifying training samples drawn from the dataset or its image representation. In one embodiment, users are presented the image graphically. Users select one or more locations in the image that they can confidently identify as being representative of a relatively pure example for one or more features of interest, hereafter referred to as "the feature(s)." Any number of graphical user interfaces, well-known in computing, can be used. For example, the user may draw simple polygons, lines, or indicate points (pixels) with a mouse or other input device on the image displayed on a computer screen. Once the user indicates that they are done collecting these training samples, the method stores the spectral information for image pixels within those regions for subsequent analysis. Alternately, the user may identify a small number of pixels as seeds which are used by known methods (described above) to identify similar pixels or data entries in the spatial or statistical neighborhood of the identified-pixels.

Training samples typically should include enough datapoints to provide statistically meaningful measures, such as means and variances, as required by the underlying statistical methods. In cases where the analysis may proceed despite having less than the desired sample size, the user may be warned of the potential problem and have the opportunity to add more examples to the training set or to proceed anyway. The method may also allow the option of using "boot-strapping" techniques to artificially increase the sample size.

Additional techniques may be used to indicate the locations of the feature(s) within an image or dataset. For example, in another embodiment the "locations" may be specified generically within geographical, geometric, or the data domains. Thus, for example, the user may specify geographic coordinates associated with the dataset, such as coordinates collected from a global positioning system (GPS) or coordinates which are stored in existing digital maps, databases, or data files, including data files in ASCII or binary format. In another example, locations can be specified using a description, including text or voice recognition approaches, and these descriptions may be cross-referenced against the image itself, other hardware/software for determining geographic position, or databases containing geographic reference data (e.g. gazetteer, geographic information system). These descriptions may also use natural language processing to identify landmarks and relative position.

In another embodiment, the location information includes references to a prior data processing history or a knowledge base or library containing characteristics of "the feature(s)." In a specific example, as described below, the image analysis process concludes with a robust transformation correlated to the features of interest in the dataset. Such transformations can be stored in a library, together with associated statistical measures, and can be used in the place of or as elements of training samples to identify the feature of interest in a particular image analysis.

The location of the feature(s) may also be specified using combinations of methods, such as "the green field (natural language with image characteristic) by the intersection of Mulberry Lane and First Avenue (intersection operator with a geographic database)." If the image presents how variables change as a function of temperature and pressure, the location may be specified as a collection of temperature/pressure ranges (or other available measurements).

In another embodiment, users can specify multiple levels for different examples of the "feature(s)" for subsequent use in the analysis, such as differential weighting of the samples in a statistical analysis. This could include different levels of confidence in identifying the "feature(s);" different levels of purity; different durations of time that a feature was present;

varying prior probabilities; or varying levels of cost, risk, or benefit associated with various user-specified examples of the feature(s).

When identification of training samples is completed, the associated data is typically stored as training data for subsequent statistical analysis. Statistical descriptors of the training data are calculated for subsequent use, such as identifying the mean value for each dimension of measurement. If these descriptors indicate that the data for the training set are not well-represented as a single feature, statistical clustering or other techniques may be used to subdivide the user-selected samples into multiple features for subsequent analysis.

In addition, the method may generate a number of transformations of the original data in order to test their utility. Examples of these transformations could include the mathematical derivatives or representations of broader curvature (e.g. depth, width, integrated area above or below the curve) in multi-dimensional datasets (e.g. spectral reflectance). In cases where the method is targeted for specific applications, typical data transformations used in those applications may also be tested. Examples of typical data transformations may include the normalized difference vegetation index (NDVI) or tasseled-cap transformation in agricultural mapping from satellite data.

Step 2: Possible Manual Identification of Contrasting Samples

In one embodiment, the user may also identify a set of locations that contrast with the feature(s). The user identifies such contrasting datapoints, or locations, in any of the manners used to identify the training set datapoints. Data corresponding to this contrasting sample set will be referred to as "not the feature(s)."

Statistical measures of the data in the contrasting sample set are calculated. Statistical analysis of such measures in relation to the training samples are undertaken and can be shown to the user. In such fashion, the analysis process may provide the user immediate feedback on the expected feasibility of separating the feature(s) from this specific set of contrasting samples, using either direct measures of statistical separability (e.g. Jeffries-Matusita distance, Transformed Divergence) or applying a classifier (e.g. Linear Discriminant Analysis, Maximum Likelihood, Mahalanobis Distance, Spectral Angle Mapper, etc.) and testing the classification accuracy for the user-defined samples. This feedback may include identifying specific pixels in the training set for the feature that appear to be problematic. Comparisons between samples that are, or are not, the feature(s) may also be performed to determine whether there are calculations that may be applied to the original measurements in order to enhance statistical separability (e.g. calculating mathematical derivatives or smoothing across a related set of measurements like wavelengths, or calculating measures of texture or shape in a local neighborhood. These calculations may be applied to the dataset, either automatically or with user approval, in order to create new measurements. The specific manipulations applied to the original data in order to create new variables is tracked in subsequent processing for the purpose of documentation and creating a repeatable method.

The user-specified samples are then incorporated in the subsequent analysis, Step 3 below. In one embodiment, the sample is screened to reduce the total number of samples undergoing analysis. The screening may be based on arbitrary criteria, or the characteristics of the individual samples relative to the entire set that are not the feature(s). Such screening may reduce redundancy and filter outlier datapoints.

Step 3: Automated Generation of Contrasting Samples

Datapoints are sampled from the dataset to represent examples that may, or may not, contain the feature(s) of interest. In a specific embodiment such datapoints are sampled without the need for further user interaction. Samples acquired in this process are added to the set that is considered "not the feature(s)," regardless of their true nature.

Data for the two cases ("the feature(s)," as taken from the training samples, and "not the feature(s)," as taken from the dataset samples) are subject to a statistical routine that generates a transformation function relating data values to the probability or proportion of a given image sample being "the feature(s)." In one embodiment, the statistical routine is a linear discriminant analysis. In alternate embodiments, the statistical routine can consist of other linear analyses, or non-linear analyses such as a logistic regression. As mentioned above, comparisons between samples that are, or are not, the feature(s) may also be performed to determine whether there are calculations that may be applied to the original measurements in order to enhance statistical separability, and the method may apply these calculations to create new measurements for the statistical analysis.

In a specific implementation, the transformation function is applied to the entire image, yielding probabilities that each pixel or datapoint contains "the feature(s)" of interest. In further implementations, the transformation function is applied to a portion of the image, such as a user-selected portion. The probabilities are compared to a threshold level. In one embodiment, the threshold is increased with each iteration from a mean value of the dataset samples to a value at one standard deviation below the mean for the training samples. In a particular embodiment, a mask image is generated indicating each pixel that has a probability exceeding the threshold level or, alternately, such pixels of interest are identified for further analysis. In yet another embodiment, the mask image is subjected to further spatial filtering to reduce outliers.

Other methods of automatically estimating the appropriate threshold for the transformed data may include an analysis of the statistical distribution of transformed values within and outside the user-specified feature/non-feature samples, assessment of spatial variability in transformed data values using measures of texture or autocorrelation, or statistical fitting of transformed data values in the neighborhood of samples for the feature(s). In cases where the user has specified multiple types of feature(s), or the method has automatically broken the training set into separate clusters, the case for defining a threshold value is understood to extend to the number of statistical dimensions required to capture the dimensionality of the training data.

A tractable proportion of pixels with higher probability scores are then sampled again and added to the samples that are considered "not the feature(s)," since these pixels are likely to include false-positives (i.e., data that is "not the feature(s)") in addition to "the feature(s)" itself. Because the statistical analysis is relatively insensitive to the inclusion of false negatives in the "not the feature(s)" set, successive iterations develop a more refined transformation of the dataset that removes false positives. The threshold probability score for sampling new "non-feature" pixels may be adjusted in each iteration. In cases where multiple features or non-features are developed, the probability scores used in the iterative process may represent different transformations that isolate specific pairwise groupings of sub-types for "the feature" versus "not the feature."

In one embodiment of calculating the statistical transformation that attempts to further isolate "the feature(s)" in each iteration, the method may cluster samples that are "not the feature(s)" into one or more classes for the statistical method in order to better delineate the unique properties of "the feature(s)." A statistical clustering (e.g. k-means, isodata) may also be used to ensure better dispersion of selected datapoints across the range of 'non-feature types' that are being confused with "the feature(s)." In this case, samples are divided among the various clusters that are identified in the data, possibly weighting the proportion of samples by additional criteria, such as down-weighting clusters that are more strongly associated with the training pixels for the feature(s) or considering the amount of local variability in the image in the distribution of samples. Other methods of distributing or weighting the samples collected in each iteration may use information on the distance or distribution of the new samples relative to the feature(s) in geographic space or measurement domains, possibly in combination with statistical clustering.

As iterations progress, further automated refinement of the original user-specified samples for the feature(s) may be performed in order to remove or down-weight statistical outliers.

The algorithm typically repeats a number of times, collecting additional samples from the image that have high probability scores in each successively refined transformation. In one embodiment, the number of iterations is limited numerically. Other stopping criteria may include a period of time, a measure of convergence in results, the degree to which training samples can be correctly predicted, or tests of the spatial pattern in the transformed results (e.g., texture, fractal dimension, uniformity, spatial autocorrelation). In another embodiment, the user can also be presented with textual or graphical feedback to allow a manual stop to the process. This feedback could be a simple indicator or an updated plot of a metric of success (e.g. convergence, accuracy) for each iteration. This feedback could also be a graphical presentation of the transformed image for the current iteration. Stopping criteria may also incorporate other sources of information on abundance of the feature(s) at different locations that may be specified by the user (e.g. independent field samples not previously entered) or that may be held back from the original set of user-specified samples as an independent test data set.

When the automated iterations reach the stopping criteria, the resulting statistical weights (i.e. probabilities) for each pixel are examined and a threshold value is estimated in order to label image pixels as containing some measurable proportion of "the feature(s)" or not. Methods of estimating the appropriate threshold may include an analysis of the statistical separation of the training data from the datapoints that are not the feature, an analysis of spatial patterns in the transformed image data, independent data provided by the user, back-classification on the user-specified pixels, or assumed patterns of spatial variation in probabilities in the neighborhood of selected image pixels. In a particular implementation, the resulting map is overlain on the image for the user to assess. Samples whose transformed value is below the current threshold are transparent, while pixels above the threshold are displayed over the image in a manner that relates to the abundance or probability of "the feature(s)" in each pixel. Users may refine the threshold value, such as by dragging a slider widget.

Other methods of presenting the results of the current transformation may include presenting the results in a second window on the computer screen, allowing the user to switch from the original data to the results in a single window, flickering between results and data, or displaying the results in conjunction with a separate dataset that corresponds with the image (e.g. field measurements, existing maps, other types of images). The method may also present results as a composite of results arising from each step of the iteration, possibly allowing the user to step back to a prior iteration before continuing.

If data on proportions of the feature are available for some samples, this data is used, in specific implementations, to convert the transformed data values into calibrated estimates of proportions of the feature within each sample using linear or non-linear statistical or curve-fitting methods. If such data is not available then calibration might also be performed by assessing the statistical distribution of data for the feature(s) to identify the most pure case (assumed 100%), and likewise estimate a representative zero point based on the current estimate of the threshold value for presence/absence of "the feature(s)."

In order to increase efficiency in data processing, data reduction methods can be employed to limit the number of samples being considered in a given iteration. Examples of data reduction may include on-the-fly systematic or randomized selection of subsets from the dataset or prior calculation of dataset representations at multiple scales (e.g. image pyramids, quad-trees, oct-trees, wavelets).

As an alternative to statistical analysis based on general linear models, this method might also use other classification methods instead of, or in addition to, the previously cited examples that are based on the general linear model (GLM) of statistics. Other approaches may use general additive models or non-parametric classification methods within the iterative structure. For example, a decision tree (or regression tree) may allow discrimination of the feature, and the transformed value that would be used in this iterative framework could be the classification accuracy (training or independent test set) associated with the node (leaf) into which each sample was classified. A GLM method like regression or discriminant analysis can also be used for the purpose of stepwise variable selection and the selected variables can be used in filtering methods that measure the departure from values of the user-specified samples for "the feature(s)" (e.g. matched-filtering)

An example of an application of steps 1-3 described in detail above is illustrated in FIG. 1. FIG. 1 shows a hyperspectral image dataset collected from an aircraft over an area north of Winnemucca, Nev. Per step 1, a user begins by identifying on the first image 10 a number of locations where a weed called tall whitetop is found. The dots on the subsequent panels 20, 30 and 40 illustrate how the method might first select samples from a regular grid and then subsequent iterations collect additional samples from different areas as the statistical transformation is sequentially refined.

Step 4: Manual Refinement

Once the result of the automated iterations is presented, the user may identify a number of areas in the initial result that appear to be false positives. The user identifies those areas on the image/result where they believe the initial result to be in error (false positive). These false positives can be identified in the same manner as described for identifying training samples, above.

In particular embodiments, these user-selected samples are then included in another iteration of the statistical routine, and the user interface is updated with the refined results. Given that the user has identified specific samples as problematic, the method may apply an additional weighting to them in the subsequent iterations of the statistical analysis. The user can have the option of specifying different levels of confidence when identifying false positives, and this information is used, in particular configurations, to weight the selected samples appropriately.

Because the statistical method provides per-sample knowledge of the probabilities associated with each datapoint (hence pixel in the image or location on the plot), the user can, in some examples, delineate areas that are believed to be false positives by simply pointing and clicking on a single location in the image rather than drawing a detailed polygon. The method then searches the local neighborhood for pixels that are labeled as having a high probability of being "the feature(s)" without the need for detailed user interaction, and these pixels are automatically collected for that iteration of the statistical analysis. Additional samples may also be collected from the image if they closely match the user's example based on statistical similarity.

In further examples, the user is presented information on which samples that they originally identified as being an example of "the feature(s)" appear anomalous or are problematic in terms of developing a clear distinction from those samples that are not "the feature(s)." The user can choose to remove or down-weight problematic training samples for "the feature(s)" in subsequent iterations.

In further examples the user can indicate what samples of "the feature(s)" were lost in an iteration (false negatives) and the system can use the history of modifications to alter current state, such as by reweighting those samples or restoring all or part of the transformed results from a previous iteration and possibly restarting the iterative process from that point with these samples being added to the training data.

In connection with the user specifying areas that are believed to be false positives, in one embodiment the method includes running a test on the existing sample data prior to applying the new refined transformation on the entire image. This can provide faster feedback to the user as to whether that type of misidentification might be successfully corrected. Similarly, in a further embodiment the process can also test whether more heavily weighting the user-identified samples provides better discrimination in the resulting statistical transformation.

In some cases, the output of the statistical transformation may provide noisy results. Smoothing methods can be applied to reduce noise and provide a more useful output. Suitable smoothing methods include local low-pass, median, or majority filtering options based on a moving window or operations in the frequency domain such as band-pass filtering with a Fast Fourier Transform or wavelets.

The disclosed methods may provide different methods of reporting the final results of the analysis. These methods may include measures of area coverage of the feature(s) within the image (e.g. % of image, acreage) or measures of the spatial configuration of the feature(s) (dispersion, contagion, fractal dimension, spatial autocorrelation, trend surface parameters). In specific implementations the method presents the user with measures of accuracy based on user supplied reference data (e.g. percent correctly classified, Kappa coefficient, contingency matrix, correlation, $r^2$). The transformation(s) of the image (possibly calibrated) can be saved/exported for use later or in other software.

Figure 3:
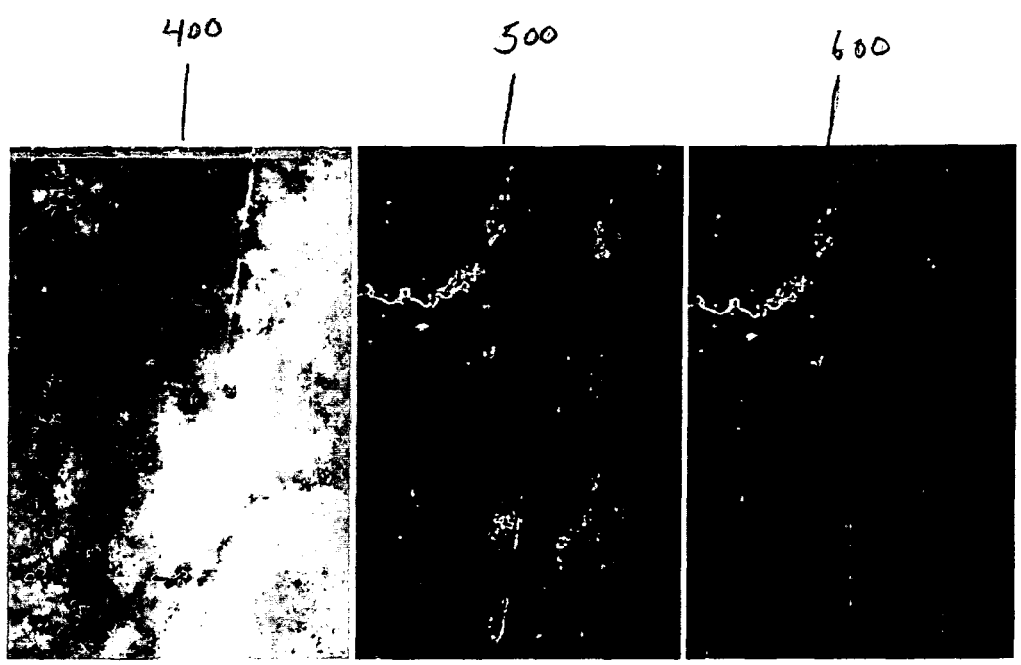
FIG. 3 shows the result of user refinement of the automated initial result. Some areas in the image on the left that have little vegetation are falsely identified as Russian knapweed in the initial result (middle panel). The false positives are seen as gray regions at the top right and bottom center. Manually identifying these areas for additional samples results in the refinement on the right where the false positives are removed. Because this removal is based on the spectral characteristics of the selected pixels rather than simple masking, this error will be eliminated or reduced elsewhere in the image and in future applications of the final statistical transformation.

FIG. 3 shows the result of user refinement of the automated initial result. Some areas in image 400 that have little vegetation are falsely identified as Russian knapweed in the initial result (image 500). The false positives are seen as gray regions at the top right and bottom center. Manually identifying these areas for additional samples results in the refinement where the false positives are removed, as shown in image 600. Because this removal is based on the spectral characteristics of the selected pixels rather than simple masking, this error will be eliminated or reduced elsewhere in the image and in future applications of the final statistical transformation.

Step 5: Calculating a More Robust Image Transformation for the Feature(s)

The process of successfully classifying the feature(s) in the image data produces a derived information product: a data transformation that can be used to identify the feature(s) in other similar image products. Certain robust methods, however, (e.g. stepwise variable selection) that enhance the generality of calculated data transformation may take additional time and provide relatively little additional value when attempting to get results from just a single image. As such, a different, typically more intensive, method may be used in calculating a robust transformation for future use than was used in the iterative framework.

If a robust technique is desired but is too slow for typical user interaction, at least certain methods of the present disclosure recalculate the transformation using robust techniques after the aforementioned steps are completed. This transformation may be derived from the same statistical techniques used in steps 3 and 4, or alternate methods may be tested against the default in order to develop the most robust image transformation. For example, linear discriminant analysis may use all available data in steps 3 and 4, but change to a robust stepwise method for step 5. Alternately, if the final state of the method shows that alternate techniques (e.g. regression tree, matched filtering on selected data dimensions) would provide better results either with respect to accuracy or efficiency, the method may provide results of the different transformation method to the user for approval and allow the user to save that transformation for future use.

Figure 4:
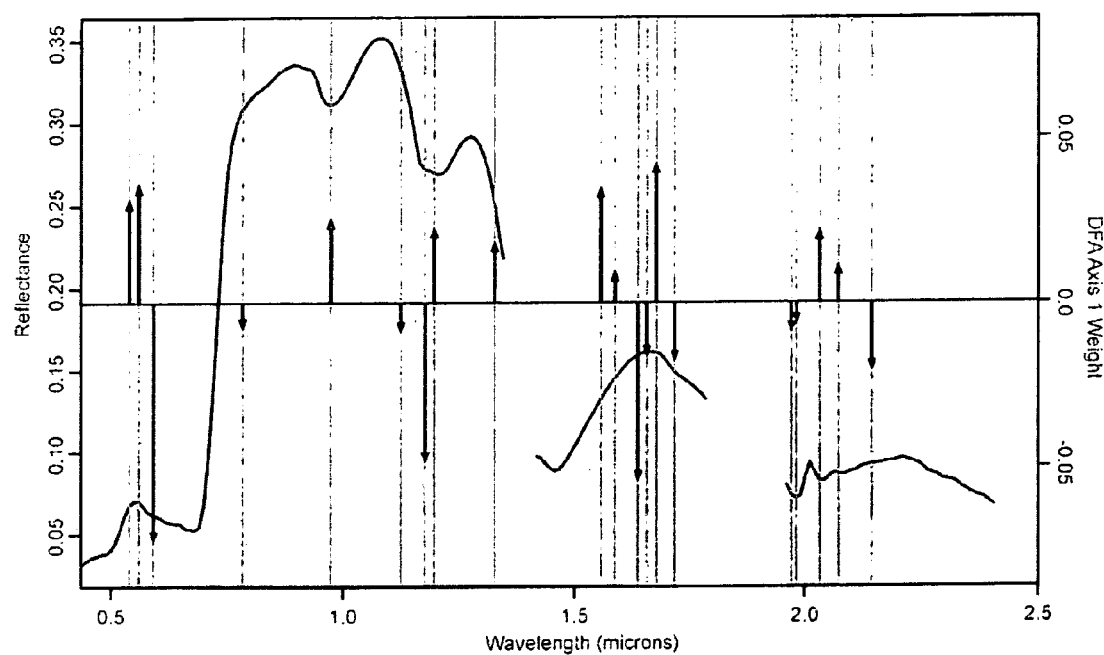
FIG. 4 shows the statistical transformation of spectral data provided by linear discriminant analysis. The curve is an example of the spectral reflectance of *Tamarix ramossissima* (units on the left side). The black arrows indicate the significant spectral wavelengths identified by the statistical method and their weighting (weights on right side). By developing a relative measure of tamarisk presence based on applying these weights to the specific wavelengths, a more robust spectral signature can be created for tamarisk as compared with typical existing methods that rely on the absolute form of the entire spectral curve.

FIG. 4 shows the statistical transformation of spectral data provided by linear discriminant analysis. The curve is an example of the spectral reflectance of *Tamarix ramossissima* (units on the left side). The black arrows indicate the significant spectral wavelengths identified by the statistical method and their weighting (weights on right side). By developing a relative measure of tamarisk presence based on applying these weights to the specific wavelengths, a more robust spectral signature can be created for tamarisk as compared with typical existing methods that rely on the absolute form of the entire spectral curve.

Figure 2:
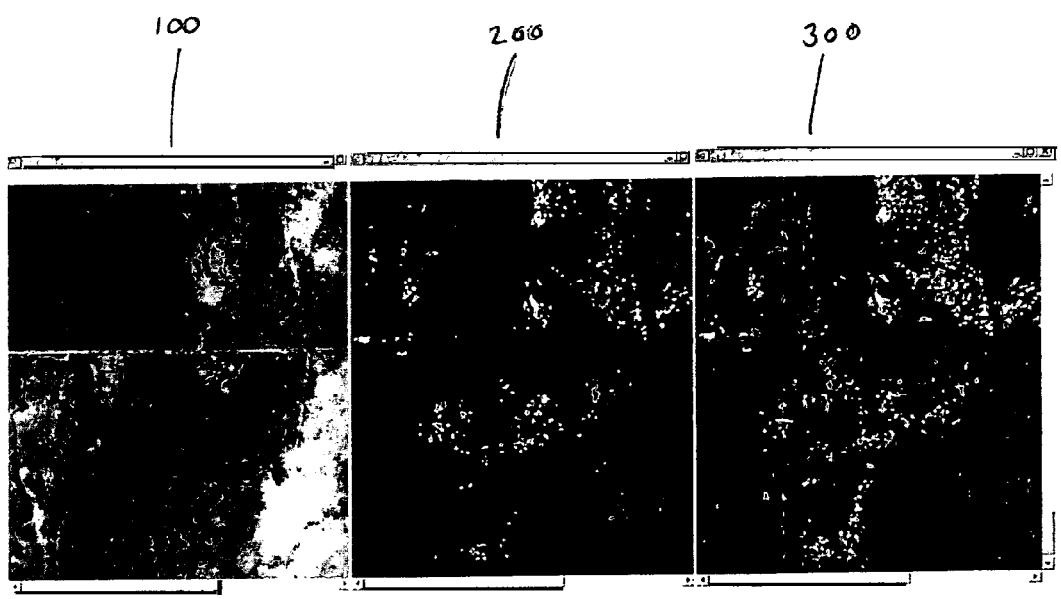
FIG. 2 shows how the result of the automated iterative process compares to a typical state-of-the-practice method called matched filtering. The matched filter method measures the degree to which each pixel in the image matches a user-specified spectral reflectance curve. The image on the left in FIG. 2 is an infrared image derived from hyperspectral imagery that was collected over Paradise Valley, Nev. The middle black-and-white image shows results for identifying the abundance of *Lepidium latifolium* (tall white-top) with the new automated iterative method. The image on the right shows how the matched filter method includes additional areas that are known to be false positives based on field work. Samples that were collected for "not the feature(s)" in the automated iterations refined the statistical transformation to screen these out.

The improvement of the presently disclosed method over prior art methods is illustrated in FIG. 2. FIG. 2 shows how the result of the automated iterative process compares to a typical state-of-the-practice method called matched filtering. The matched filter method measures the degree to which each pixel in the image matches a user-specified spectral reflectance curve. Image 100 in FIG. 2 is an infrared image derived from hyperspectral imagery that was collected over Paradise Valley, Nev. Image 200 shows results for identifying the abundance of *Lepidium latifolium* (tall white-top) with the new automated iterative method as described in detail above. Image 300 shows how the previously known matched filter method includes additional areas that are known to be false positives based on field work. Samples that were collected for "not the feature(s)" in the automated iterations refined the statistical transformation to screen these out.

Applications

One embodiment disclosed herein can distinguish specific features in image data (as generically defined above) from a variety of other image components that are not of interest to the user. The method allows the variation in these other components to be sampled in a way that effectively covers their range of variability and allows user knowledge to be incorporated. This generic capability has a wide range of applications, including but not limited to:

- forestry (tree species identification, disease detection)
- agriculture (crop identification, crop disease detection, weed detection/identification),
- water quality (weed/algae detection/identification, suspended sediment detection, plankton detection/identification, oil slick detection)
- military (target detection/identification, soil/rock/plant/water identification for trafficability)
- resource management/extraction (rock/soil identification, weed detection/identification, plant species detection/identification, forage mapping)
- planetary exploration (rock/soil identification)
- data mining
- feature extraction from large multidimensional image datasets as generated in any number of fields, from, for example, earth science applications to medical imaging A specific application of the disclosed techniques is included in the attached Appendix A, which in incorporated by reference in its entirety. In the event of any conflict between the disclosure of Appendix A and the present disclosure, the present disclosure shall control.

EXAMPLE

Specific Implementation of an Image Processing Algorithm

This Example provides a specific example of an image analysis method according to the present disclosure. This Example applies the method in the specific context of extracting features, identified in one or more regions that contain multiple datapoints, from a large, multi-dimensional dataset graphically displayed on a computer monitor. The minimum number of data points may vary, but most statistical methods require more datapoints than the number of data dimensions. In particular, the dataset in this Example consists of high resolution hyperspectral information gathered from surveying a specific geographic region.

The data in this particular application contains a plurality of features, having varying statistical relations to each other. The features of interest in this particular example consist of the particular reflectance spectrum associated with user-specified data points. For example, the feature could be a spectrum associated with the reflectance from a particular plant species that the user wants to extract from the image, thereby—for example—identifying the location of the feature in the dataset globally, or to specify as a false positive that the user wants to suppress or filter out from the dataset globally.

This dataset is represented in a manner such that individual points, which may be depicted on the image or plot (X,Y coordinates) contain multidimensional, hyperspectral information, and a display on a computer monitor relates to a spatial distribution across the sampled geography.

It will be understood by those skilled in the art that the image analysis process is not limited to this specific example, application, or context, and is plainly not limited by either the dimensions or properties of this particular dataset, nor the foregoing manner of representing it graphically. The manner in which large, multidimensional datasets can be represented graphically, and subject to this image analysis process, like the nature of features which might require analysis or extraction from such datasets, is unbounded.

In this specific embodiment, the method follows these steps, implemented on a computer:

Graphic Representation (1) The user displays an image of a dataset containing multiple dimensions of measurement, in this Example, brightness in different wavelengths of light.

Identifying Training Samples from Dataset by User Interface (2) The user identifies points or superposes polygons on the image representing a number of instances of the feature in which they are interested.

(3) Data for the pixels which the user identified are stored as training data for subsequent statistical analysis.

(4) A mean value of the data in the training samples, for each of the dimensions of measurement, is calculated for subsequent use. Here, the dimensions of the hyperspectral dataset include reflectance or intensity at each sampled wavelength for each entry in the training sample.

First Sampling from the Rest of the Dataset (the Entire Dataset, Excluding the Training Samples)

(5) A systematic sampling of image pixels is collected by the program to contrast with the user-selected datapoints (the training samples). In this specific Example, the sampling consists of selecting entries (which may have been graphically displayed as pixels) from the dataset at regularly spaced intervals. Where the dataset has more entries than can be accommodated by the resolution of the graphic depiction, not every dataset entry will be displayed. In one implementation, 5000 samples are drawn from the dataset by calculating a lattice spacing in the dataset that provides 50 columns and 100 rows, and data values at each lattice intersection are sampled.

The Dataset Samples are Analyzed for Statistical Relation to the Training Samples, in Iterative Fashion (6) The method begins an iterative analytic routine. In this specific Example, the iterations are limited to a maximum number, in this case 6.

The Iterative Analytic Process:

(7) The two sets of data [user-specified (training samples) and program-sampled (dataset samples)] are assigned a class number (1, 0) and are used in a linear discriminant analysis (LDA). The LDA creates a scaling matrix that converts the data to a discriminant function that maximizes the difference in means of the two classes.

(8) The LDA scaling function is applied to the original data to create a derived image of the discriminant function values.

(9) The means of the discriminant function values are calculated for the entire image and for the user-specified training pixels. The standard deviation of discriminant function values for the user-specified training pixels is calculated.

(10) A threshold is determined in relation to the discriminant function value of the entire image. The threshold is selected, in this example, so that it can increment from the mean of the entire image (on the first iteration), to one standard deviation below the mean of the user-specified training pixels (on the final iteration). Thus, the threshold increases with each successive iteration. The discriminate function values for the entire image are compared to the relevant threshold, as follows.

(11) A mask image is created which identifies the pixels in the calculated discriminant function image that exceed the threshold (step 10) as 1, and those below the threshold as 0. The pixels with a mask image value of 1 are the pixels of interest. The mask speeds processing and focuses the analysis only on the pixels of interest.

(12) If the maximum number of iterations is reached, or the composition of pixels in the mask (Step 11) (the pixels of interest) have changed less than 5% from the previous iteration, then the iterative analysis is concluded. The 5% figure is observed in this particular example or application to provide acceptable balance between computation time and precision in results. If the stopping criteria is reached, the process continues at Step 19, below. Otherwise, the process continues as follows:

(13) A spatial filter with a 3×3 neighborhood is applied to the mask image (the pixels of interest) in order to remove single thresholded pixels (1) that are entirely surrounded by mask values of 0. It is assumed that these pixels may represent noise more than relevant variation in data values. Removing such datapoints from the set also speeds subsequent processing.

Dataset Sampling for Subsequent Iterations Based on Statistical Analysis of Dataset Entries:

(14) Data from the original image, corresponding to filtered mask values of 1 (the pixels of interest), are run through a statistical clustering routine. In this particular example, the routine is K-means. In this particular example, 30 clusters are specified for output. It is readily appreciated that the number of clusters identified in this step can vary widely as needed to improve the discriminate power of the analysis. In general, the most appropriate number of clusters to use is dependent on the amount of variation in the image, which in turn depends on the complexity of the scene, the resolution of the dataset, and the data dimensionality. Other methods like ISO-DATA clustering provide a variable number of clusters depending on user specified parameters for the cluster routine. The selection of clustering routine and number of clusters is largely a function of the processing power of the device running the analysis, and the properties of dataset under analysis. From experience in this particular example and application, 30 clusters provides adequate balance between distributing subsequent samples across a range of image components, and running the analysis within a practical processing time.

(15) The clustering analysis produces another type of mask image (the clustering mask image). The clustering mask image represents a pixel with 0 where the original mask image also had a 0 entry. The remaining pixels of interest from the mask image, however, are assigned a number—here, 1-30—depending on the statistical cluster to which the pixel of interest was assigned in the foregoing analysis. In addition, the means of the original data values corresponding to each cluster are calculated, and the Euclidean distance of the cluster mean to the training sample means (Step 4) is calculated.

(16) Euclidean distances are rescaled from 0 to 1. Here, 0 is associated with the cluster having the mean that is closest, in Euclidean distance, to the training sample mean, and 1 being the farthest. Rescaled distances are then squared to move near-zero values closer to zero.

(17) Another 5000 random sample locations are drawn from the clustered pixels of interest. The proportion of samples is weighted by the cluster's transformed distance from the training sample mean (Steps 16, 4). It is understood that the number of samples can vary. In this particular example, a sample size of 5000 works well for the particular dataset under analysis. This step helps to ensure that fewer samples are wasted on false negatives, because less similar clusters (that is, in this particular example the clusters having mean values with greater Euclidean distance from the training sample means) are sampled more heavily. These new dataset samples are added to those used in previous iterations.

(18) Begin next iteration—Step 6.

Further Operation on the Discriminant Function

(19) The final iteration yields a discriminant function as described above. The results are displayed as a mask image showing pixels of interest having a discriminate function value above a threshold. The mask image is a gray scale rather than a binary filter, showing brighter shades of grey approaching white as increasing discriminant function values approach unity. The mask image can be overlain on the graphical representation of the dataset, or the user may review the results by looking at an image of the probability surface provided by the discriminate function (e.g., the user can look directly at the analytic results rather than an overlay of the original data). In this particular example, the initial threshold for displaying final results is currently estimated by choosing a neighborhood surrounding one of the training areas and setting the threshold to the minimum discriminant function value within that region. The user is provided graphic interface, in this particular example a sliding bar or a slider, that allows the user to specify a threshold value for the final discriminant function that indicates presence/absence of the features of interest. Discriminant function values associated with the dataset entries, which exceed this threshold, correspond to increasing amounts of the selected feature in the pixel.

User-Identified False Positives

(20) The final results are reviewed. In this example, if the user sees an entry or pixel incorrectly classified as the target features, then the user can manually identify those data entries or pixels. In this particular example, that is done by any number of graphic interfaces, by drawing a polygon on the image, as done above to identify training features. The same information may be entered, for example, in this particular application by specifying geographic coordinates (latitude and longitude) correlating to the spatial location of the false positive under consideration. Data from those pixels is then added to the dataset samples in the last iteration and the method reruns Steps 7, 8 and 19. This step (#20) may be repeated as many times as necessary.

Generating Robust Analytic Representations of the Features of Interest

(21) The process may then generate the robust transformation of the features of interest by running the final set of samples through a more intensive stepwise variable selection for the discriminant analysis. This is currently implemented using a backward variable selection with Akaike's Information Criterion. The transformation that results is robust to the features of interest, and can be used as a representative identifier for the features of interest in a library of data transformations. In this particular application, for example, as shown in FIG. 4, the process generates a final robust transformation that is a unique function for the reflectance spectra of *Tamarix ramossissima* in hyperspectral image data over 174 bands from the AVIRIS sensor at 3.7 meter resolution, provided in standard geometrically corrected format.

(22) The user may apply the stored transformations (original or robust) to new images or datasets having the same data characteristics as the dataset used to generate the robust transformation. In particular, the exemplar feature transformation and its related statistics can be used as or included in the training samples described in step 2 above. Alternatively, exemplar feature transformations may be for features that are not of interest to the user, but which the user has reason to believe are present in the image data or dataset, can be identified as false positives and included in the dataset samples at any stage in the iterations.

It should be understood that the foregoing relates only to particular embodiments and that numerous modifications or alterations may be made without departing from the true scope and spirit of the invention as defined by the following claims.

What is claimed is:

1. A method for analyzing an image comprising:
   (1) providing an image comprising a plurality of locations, each location corresponding to data;
   (2) receiving user input identifying at least one location in the image having data representing a feature of interest and classifying the location and its associated data in a first class;
   (3) receiving user input identifying at least one location in the image having data that is not representative of the feature of interest and classifying the location and its associated data in a second class;
   (4) selecting a sample of locations in the image having data and classifying the locations and its associated data in the second class;
   (5) performing statistical analysis on the data in the first class and the second class to generate a transformation function that relates the data to a probability of each of the locations being the feature of interest;
   (6) classifying locations having a high probability of being a feature of interest in the second class;
   (7) repeating steps (4) through (6) a predetermined number of times;
   (8) setting a threshold value based on the probability of each location being the feature of interest;
   (9) designating locations having a value above the threshold value as being a feature of interest and designating locations having a value below the threshold value as not being a feature of interest; and
   (10) presenting the image showing locations of the feature of interest.

2. The of claim 1, further comprising:
   (11) receiving user input identifying false positives in the image showing location of the feature of interest of step (10);
   (12) performing statistical analysis as in step (5) wherein locations identified as being a feature of interest in step (9) are classified in the first class with the exception of the identified false positives from step (11) being classified in the second class; and
   (13) repeating steps (8) through (10).

3. A method for analyzing an image comprising:
   (1) providing an image comprising a plurality of locations, each location corresponding to data;
   (2) receiving user input identifying at least one location in the image having data representing a feature of interest and classifying the location and its associated data in a first class;
   (3) selecting a sample of locations in the image having data and classifying the locations and its associated data in a second class;
   (4) performing statistical analysis on the data in the first class and the second class to generate a transformation function that relates the data to a probability of each of the locations being the feature of interest;
   (5) classifying locations having a high probability of being a feature of interest in the second class;
   (6) setting a threshold value based on the probability of each location being the feature of interest;
   (7) designating locations having a value above the threshold value as being a feature of interest and designating locations having a value below the threshold value as not being a feature of interest; and
   (8) presenting the image showing locations of the feature of interest.

4. The method of claim 3, further comprising:
   (9) receiving user input identifying false positives in the image showing location of the feature of interest of step (8);
   (10) performing statistical analysis as in step (4) wherein locations identified as being a feature of interest in step (7) are classified in the first class with the exception of the identified false positives from step (9).

5. The method of claim 3, further comprising repeating steps 3-5 a predetermined number of times.

6. The method of claim 4, further comprising repeating steps 6-8.

7. The method of claim 4, further comprising repeating steps 3-8.

8. The method of claim 4, further comprising repeating steps 3-8 a predetermined number of times.

9. The method of claim 4, further comprising repeating steps 9 and 10.

10. The method of claim 4, further comprising repeating steps 9 and 10 a predetermined number of times.

11. The method of claim 3, wherein the image comprises hyperspectral image data.

12. The method of claim 1, wherein the image comprises hyperspectral image data.

* * * * *